United States Patent Office

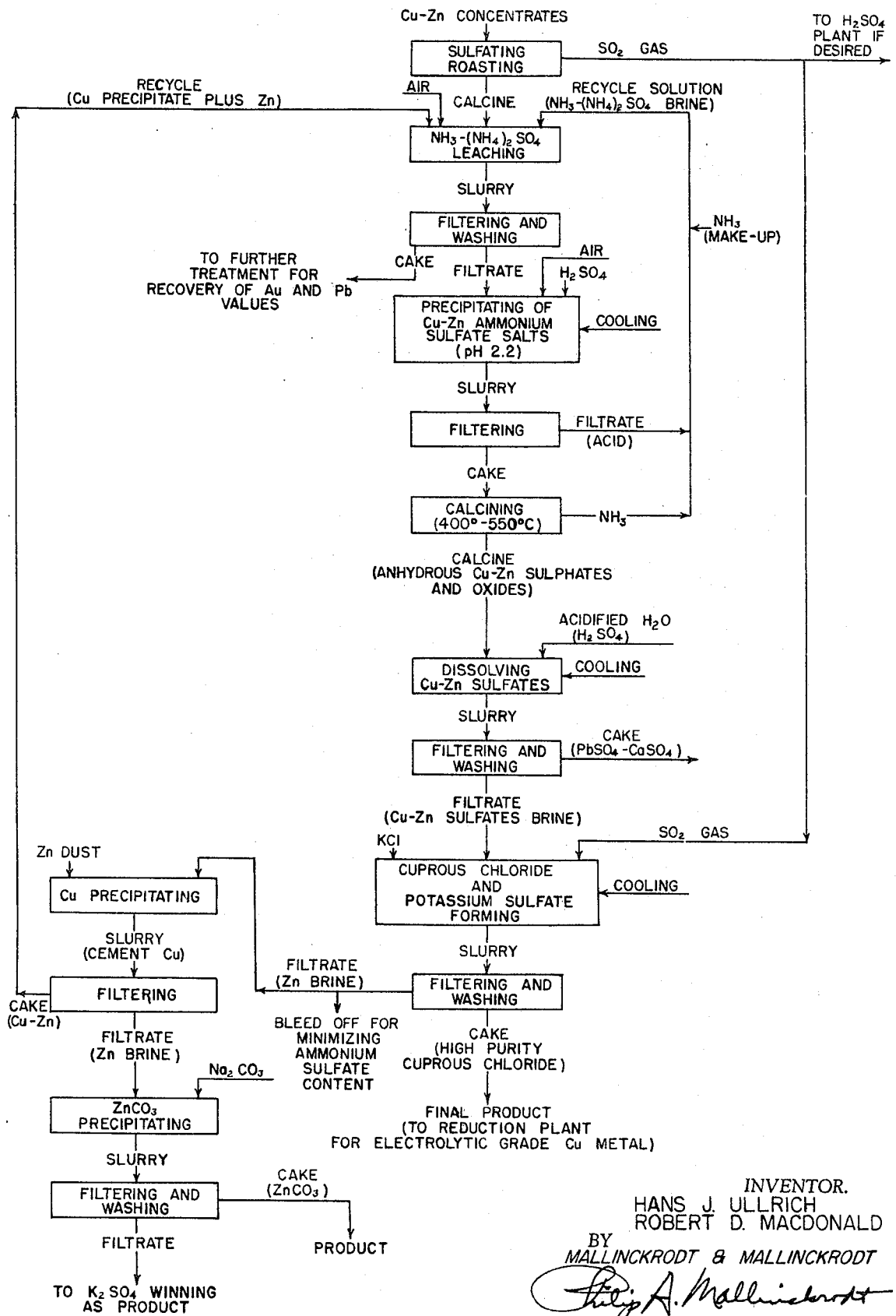

3,523,787
Patented Aug. 11, 1970

3,523,787
HYDROMETALLURGICAL PROCESS FOR THE RECOVERY OF HIGH PURE COPPER VALUES FROM COPPER AND ZINC BEARING MATERIALS AND FOR THE INCIDENTAL PRODUCTION OF POTASSIUM SULFATE
Hans J. Ullrich, Salt Lake City, Utah, and Robert D. MacDonald, Newtown, Conn., assignors to United States Smelting, Refining and Mining Company, a corporation of Maine
Filed Jan. 25, 1967, Ser. No. 611,615
Int. Cl. C22b *3/00;* C01d *5/00*
U.S. Cl. 75—103                                9 Claims

ABSTRACT OF THE DISCLOSURE

This invention is a hydrometallurgical process for separating copper and zinc values from other materials and from each other, for recovering the copper values (in highly pure form, if desired), and for incidentally producing potassium sulfate. These objectives are accomplished by subjecting a non-sulfide copper and zinc bearing material to an ammonia, ammonium sulfate leach; by acidifying the resulting solution within a controlled pH range to produce a copper-zinc ammonium sulfate precipitate; and by eliminating ammonia from such precipitate to yield a copper-zinc sulfate brine, from which cuprous chloride of high purity can be precipitated by addition of potassium chloride and sulphur dioxide, the liquid phase being treated in known manner for the separate recovery of potassium sulfate and the zinc values.

PRIOR ART

It has been proposed in Schaulfelberger U.S. Pat. No. 2,695,843, Nov. 30, 1954, to separate zinc and copper values and to produce an ammonia, ammonium carbonate leach, followed by independent and separate precipitation of the copper and zinc values. Although an ammonia, ammonium sulfate leach has been recognized as also operable to place certain metallic values, e.g., oxidized copper and zinc values, in solution, an ammonia, ammonium carbonate leach solution has been preferred, see Edwards et al. U.S. Pat. No. 1,608,844, Nov. 30, 1926, except when actively oxidizing a sulfide sulfur starting material, containing nickel, copper, and cobalt, under conditions of elevated temperature and pressure, see Forward et al. U.S. Pat. No. 2,726,934, Dec. 13, 1955, McGauley U.S. Pat. No. 2,647,819 deals with pH adjustment of either an acid or an ammoniacal leach solution to precipitate iron values followed by treatment of the liquid phase for separation of copper, nickel, and cobalt values.

SUMMARY OF THE INVENTION

The process is applicable to various copper and zinc bearing materials, for example, metallurgical concentrates that are derived by the flotation of crushed and ground copper ores of various types, to smelter mattes, speisses, and drosses; and to scrap metal materials that are obtained from a variety of metal-working operations. The several steps employed in the process depend upon the particular feed material being treated. Thus, when treating flotation concentrates of sulfide ores, the concentrates are first roasted (preferably a sulfating roast) to eliminate sulfur in the sulfide form prior to a subsequent leaching step utilizing ammonia and preferably also ammoniumsulfate as the leaching agent. Other materials may not require roasting preliminary to leaching, but may benefit from some other conditioning step, such as oil or grease removal, size reduction, etc., as will be apparent to those skilled in the art on the basis of common knowledge and procedures.

The ammonia, ammonium-sulfate leach is not a new procedure in and of itself, but is important in the overall process of this invention for the purpose of solubilizing the copper, zinc, and any silver present, and for enabling an effective and economic separation of these values from iron and any other insoluble values, such as gold and various gangue materials that might be present.

The next step in the process is believed to be new in and of itself and is important in the overall process for the purpose of separating copper and zinc values from the leach liquor in a form facilitating subsequent separation of these values from each other. Thus, the leach liquor containing the copper and zinc in solution is acidified, as by the use of sulfuric acid, to bring the solution within a controlled acid pH range, wherein copper-zinc-ammonium compounds are insoluble, so that such compounds will precipitate from the leach liquor, aided, if necessary, by simple aeration of such liquor.

Recycling of the stripped leach liquor to the leaching step, following separation of the precipitate therefrom, insures conservation of whatever copper and zinc values remain, and, in addition, effects a build-up of silver values therein, which can be recovered—when the concentration of silver makes it worthwhile—by, for example, precipitation with copper powder.

Since the thermal decomposition points of copper sulfate and zinc sulfate are higher than the volatilization temperature of ammonia, it is possible to drive off the ammonia from the copper-zinc-ammonium sulfate precipitate, by heating such precipitate, and to recover the ammonia for recycling to the leaching step. The residue is composed mostly of anhydrous copper and zinc sulfates and oxides, usually accompanied by some lead values and other impurities.

The copper and zinc sulfates and oxides are put into solution, free of any lead values that might be present in the feed material, and of other insolubles, by adding, to the residue, water that has been very lightly acidified with sulfuric acid to render lead values insoluble as lead sulfate. Separation of the liquid phase from the solid phase yields a copper-zinc sulfate brine. In instances where sufficient lead values are present in the feed material, the solid phase can be smelted for recovery of metallic lead, if desired.

The copper-zinc sulfate brine is treated by the addition of potassium chloride (potash) to yield soluble copper and zinc chlorides and potassium sulfate, the latter being much more valuable as a fertilizer than the potassium chloride used as a reagent and being obtained in even greater quantity than the quantity of potassium chloride reagent utilized. The copper chloride is cupric, but is placed in cuprous form and precipitated as colorless to white crystals by treating the solution with sulfur dioxide gas. The cuprous chloride is highly pure and can be reduced to metallic copper, normally of electrolytic purity, in a variety of ways well known to the art, for example and preferably by treatment with soda ash ($Na_2CO_3$) or high purity lime in the presence of free carbon, such as coke, and a fluxing agent.

Since some copper values remain in the solution with the zinc values, they are removed in any convenient way, advantageously by cementation on zinc dust, which is added to the solution for this purpose.

Separation of the liquid phase from the solid phase of the slurry resulting from the above treatment, yields a zinc and potassium sulfate brine substantially free of harmful impurities. The solid phase—precipitated copper and some undissolved zinc—is recycled to the leaching stage of the process.

The zinc and potassium sulfate brine is treated in any convenient manner for the separation of the zinc and potassium sulfates, usually by the addition of soda ash to precipitate the zinc as insoluble zinc carbonate, followed by separation of the precipitated solid phase from the liquid phase and removal of the potassium sulfate from the liquid phase by plain evaporation or by the standard method of Glaserite, $K_3Na(SO_4)_2$, precipitation, followed by repurification, all as is well known in the art.

By this overall process of the invention, metallic copper of requisite high purity can be produced from a variety of copper and zinc bearing feed materials entirely by chemical means, without fire or electrolytic refining procedures; any lead present can be recovered economically, as can silver and gold; the process is free from air-pollution problems, requires no exotic equipment, such as special autoclaves, and is economical in terms of both reagents and labor; the several processing steps can be carried out on a continuous basis, and can be easily automated; there is no need to produce separate flotation concentrates of copper and zinc when a copper-zinc ore is concerned; the recovery of zinc values from such an ore is ordinarily increased; and quantities of potassium chloride used as a reagent are converted to the more valuable potassium sulfate as a by-product.

As sub-combinations of the overall process, there are provided advantageous new processes for separating copper and zinc values from other metallic values and for separating copper and zinc values from each other.

DESCRIPTION OF DRAWING

There is shown in the accompanying drawing specific procedures representing what is presently believed to be the best mode of carrying out the invention in industrial practice. From the detailed description of these, additional objects and features of the invention will become apparent.

In the drawing, the single figure represents a flow sheet indicative of the procedures and equipment employed in the preferred industrial application of the process with respect to flotation concentrates of a typical copper-zinc ore.

DETAILED DESCRIPTION

In the specifically illustrated and described embodiment of the invention, copper-zinc ore concentrate obtained from the flotation of a copper sulfide ore, for example the concentrate produced by United States Smelting, Refining & Mining Company at its Continental property in Bayard, N. Mex., is first subjected to a sulfating roast in standard equipment, such as a fluidized bed roaster maintaining an $SO_2$ atmosphere with controlled addition of air and a roasting temperature below the thermal decomposition points of copper and zinc sulfates in order to eliminate sulfide sulfur in preparation for an ammonia, ammonium sulfate leach. Ammonium sulfamate can be substituted for the ammonium sulfate if desired.

The particular ore indicated contains lead, silver, and gold, as well as copper, zinc, and iron. A typical assay of tre concentrate is as follows:

Au, .12 oz./ton; Pb, 0.2%; Zn, 2.9%; Bi, 0.012%; Ag, 3.30 oz./ton; $SiO_2$, 1.6%; S, 34.6%; As, 0.09%; Cu, 31.6%; Fe, 28.4%; CaO, 0.20%; Sb, 0.05%.

The sulfur dioxide gas generated during the sulfating roast may be utilized to produce sulfuric acid for use in subsequent steps of the process, and at least part of it is advantageously employed as a reagent in the step of converting cupric chloride to cuprous chloride in a copper-containing solution at a later stage of the process.

The roasted ore concentrate is subjected to an ammonia, ammonium sulfate leach in any suitable type of vessel, such as covered leach tanks. Such a leach is known; no special considerations apply here, except that aeration of the leach slurry has been found to have some effect in oxidizing cuprous ions to cupric and thereby facilitating dissolution of the copper values. A sufficient quantity of the leach reagent is employed to place in solution the copper, zinc, silver, and part of the lead present in the ore material. The gold and iron remain in the leach residue along with other insolubles. The leach slurry is easily filtered to remove substantially all the iron, and the resulting filter cake can be treated by cyanidation for the recovery of gold in instances where sufficient gold is present to make it economic to do so.

The filtrate is passed into a precipitation tank and treated by the addition of sufficient mineral acid, preferably sulfuric, to lower the pH to below about 3.0, e.g., within the range of from about 3.0 to about 1.6. Copper and zinc values precipitate as copper-zinc ammonium sulfate salts. It has been found that aeration of the solution promotes formation of these salts, and, since the reaction is exothermic, the precipitation vessel should be cooled. Optimum recovery is had at a pH within the range of about 2.6 to 2.0. At a pH of 2.2, for example, 84.15% of the copper is precipitated, and there is little gained by lowering the pH further. The barren, i.e., depleted, solution is recycled to the leaching step, so the values remaining in solution are not lost. If warranted economically, usually after several recycles of the solution to permit build-up of values, silver is recovered from such solution by the addition thereto of copper powder as a precipitant, the metallic silver being removed as a by-product by centrifuging, as indicated.

Separation of the solid and liquid phases is advantageously carried out by filtration, as the filtering characteristics of the salt precipitate is very good. The caked solids from this filtering step contain copper, zinc, lead and ammonium sulfates as complex salts, which is heated within a temperature range of 400° to about 550° C. to drive off moisture and liberate ammonia ($NH_3$). The ammonia gas is preferably recycled to the leaching stage, where it is introduced along with whatever make-up ammonia may be required for the continued application of the process.

The calcine solids from the heat treatment are a mixture of anhydrous copper and zinc sulfates and oxides, which are water soluble, with impurities. For this purpose, the calcine solids are slurried with water and just enough mineral acid, preferably sulfuric, to render the lead and calcium values insoluble as lead sulfate ($PbSO_4$) and calcium sulfate (gypsum), respectively. Any magnesium values that might be present remain in solution. Since this reaction is exothermic, it is usually desirable to provide for cooling. Filtration of the resulting slurry separates the insolubles from the liquid phase, which is a copper-zinc brine of high purity. The insolubles, containing lead values, can be smelted for recovery of lead in the metallic state when considered economically feasible. Centrifugal separation accompanied by washing stages may be prefererd to the usual filtration procedures.

The filtrate brine of mixed copper and zinc sulfates is treated by the addition of enough potash (KCl) to convert the metal sulfates to chlorides in accordance with the following reactions:

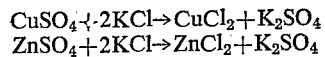

$$CuSO_4 + 2KCl \rightarrow CuCl_2 + K_2SO_4$$
$$ZnSO_4 + 2KCl \rightarrow ZnCl_2 + K_2SO_4$$

whereupon enough $SO_2$ gas is bubbled through the solution to reduce the copper ions from the cupric to the cuprous state. The cuprous chloride (CuCl), so formed, precipitates out of solution as colorless to white crystals, which can be reduced to copper metal of high purity (usually equal to that of electrolytic copper) by any one of several procedures well known to the art, for example, that previously indicated as an advantageous procedure for this purpose.

In a typical instance, about 87% of the copper present in th feed concentrate was contained in the cuprous chloride crystals, leaving about 13% in the filtrate solution containing the zinc values as zinc chloride (ZnCl).

In order to remove the copper that remains in the zinc brine, it is advantageous to add zinc dust as a precipitant and to recycle the precipitate to the ammonia, ammonium sulfate leach following its separation from the liquid phase, preferably by filtration. The thus purified zinc brine is then treated for the recovery of zinc values, advantageously by the addition of soda ash, i.e., sodium carbonate ($NaCO_3$), to precipitate the zinc as zinc carbonate ($ZnCO_3$) accompanied by the formation of common salt ($NaCl$).

Following removal of the zinc precipitate, as by filtration and washing, the filtrate is treated for the recovery of the potassium sulfate, e.g., by evaporation, followed by the standard method of Glaserite $K_3$ Na $(SO_4)_2$ precipitation, which need not be detailed here. It is significant to note that, for each ton of potassium chloride consumed as a reagent, there is produced approximately 1.2 tons of potassium sulfate.

A typical laboratory example is as follows:

A sample, unusually high in zinc, was selected from copper-zinc flotation concentrates coming from the mill of United States Smelting, Refining & Mining Company at its Continental properties near Bayard, N. Mex., and was roasted in a gas-fired muffle furnace for twenty-four hours at about 650° F. Although a sulfating roast would have aided extraction of metal values in the subsequent leaching step, the muffle furnace was available and maximum metal extraction was not important for this test.

The unusually high zinc content of the sample was desired in order to point up the effectiveness of the process in separating the copper content from the zinc content of the material being treated.

A 1000 gram batch of the roasted sample, which analyzed as follows:

Au, 0.10 oz./ton; $SiO_2$, 2.0%; Ag, 3.1 oz./ton; Fe, 21.3%; Cu, 22.15%; Zn, 24.00%; Pb, 0.35%; was leached for 3½ hours at room temperature in an ammonia, ammonium sulfate solution made up by dissolving 750 grams of ammonium sulfate in 750 ccs, of ammonium hydroxide ($NH_3$ concentration 28%) and 1500 ccs. of tap water. The leach slurry was filtered, yielding a filtrate solution containing 41.75 grams per liter of copper, 12.8 grams per liter of zinc, and 0.25 milligram per liter of silver. This filtrate solution was then acidified by the addition of sulfuric acid to a pH of 2.2, yielding a copper-zinc ammonium sulfate precipitate assaying 14.75% copper and 6.4% zinc. The solution remaining after precipitation of this copper-zinc ammonium sulfate contained by analysis 6.55 grams per liter of copper, 45 milligrams per liter of zinc, 0.25 milligram per liter of silver, and 18.6 milligrams per liter of lead.

The copper-zinc ammonium sulfate (filter cake) was roasted in an electric furnace at a temperature between 400° and 550° C., resulting in a weight loss of 52.3%, represented by the ammonia content and moisture. The resulting copper-zinc sulfate calcine was dissolved in water, which was lightly acidified with sulfuric acid. The resulting solution was cooled, and potassium chloride slightly in excess of the stoichiometric amount necessary to convert the copper and zinc sulfates to chlorides was added. Sulfur dioxide gas was then bubbled through the solution in sufficient quantity to precipitate cuprous chloride. After filtration from the solution, followed by drying, the cuprous chloride precipitate assayed as follows:

Cu, 63.75%; Pb, 0.005%; Ag, 0.0002%; Zn, 0.0005%; Fe, 0.01%; Bi, 0.0039%.

The filtrate solution remaining after separation therefrom of the cuprous chloride precipitate was treated with soda ash, resulting in precipitation of the zinc, quantitatively, as zinc carbonate.

Calculations showed that 84.15% of the copper that went into solution during the leaching stage reported in the copper-zinc ammonium sulfate precipitate, 15.85% of such copper remaining in the recycle solution. Of the copper in the copper-zinc ammonium sulfate precipitate, 86.98% reported in the cuprous chloride product. The 13.02% that remained in the copper-zinc sulfate solution was precipitated from such solution by the addition of zinc dust thereto.

In applying the process to scrap metal in the laboratory, the leach solution was agitated during leaching by air continuously bubbled through the leaching vessel. Otherwise, the procedure was the same and the results similar to the foregoing example.

Whereas, this invention is here described with respect to certain preferred procedures, it is to be understood that variation are possible without departing from the subject matter particularly pointed out in the following claims, which subject matter we regard as our invention.

We claim:

1. A hydrometallurgical process for recovering highly pure copper values from an ammoniacal solution containing copper and zinc values as ammonium sulfate salts and for producing potassium sulfate as a by-product, comprising the steps of acidifying a said solution within a pH range of about 3.2 to about 1.6 to precipitate the copper and zinc values as the corresponding ammonium sulfate salts;

separating the precipitated salts from the acidified solution;

heating said precipitated salts to liberate ammonia and produce copper and zinc sulfate salts;

dissolving said sulfate salts in water to form a copper-zinc brine of high purity;

adding potassium chloride to said brine to form soluble copper and zinc chlorides and potassium sulfate;

treating the resulting brine with sulfur dioxide to precipitate the copper values as cuprous chloride crystals of high purity;

separating the precipitated cuprous chloride from the brine liquor; and treating the resulting brine liquor for the separate recovery of the potassium sulfate and the zinc values.

2. A hydrometallurgical process as set forth in claim 1, wherein the ammoniacal solution is derived by subjecting material solids containing copper and zinc values in substantially non-sulfide form to an ammonia, ammonium sulfate leach; and separating the liquid phase of the resulting leach slurry from the solid phase thereof.

3. A hydrometallurgical process as set forth in claim 2, wherein the ammonia liberated from the precipitated copper-zinc ammonium sulfate salts is recycled to the ammonia, ammonium sulfate leaching stage.

4. A hydrometallurgical process as set forth in claim 2, wherein the material solids subjected to the ammonia, ammonium sulfate leach contain iron and precious metal values which are insoluble and remain in the residue solid phase of the slurry after separation of the liquid phase therefrom; and the said solid phase is treated for the recovery of said precious metal values.

5. A hydrometallurgical process as set forth in claim 4, wherein any silver values remaining in the ammoniacal solution are precipitated therefrom by the addition of metallic copper powder to said solution following the acidification thereof and the precipitation of the copper-zinc ammonium salts; and the resulting solution is recycled to the ammonia, ammonium sulfate leach stage.

6. A hydrometallurgical process as set forth in claim 1, wherein the brine liquor, from which the cuprous chloride is separated, is treated for the removal of residual copper values by the addition of metallic zinc dust for the precipitation of said copper values;

the precipitated copper values are separated from the brine containing the potassium sulfate and the zinc values; and said precipitated copper values are recycled to the ammonia, ammonium sulfate leach stage.

7. A hydrometallurgical process as set forth in claim 1, wherein sulfuric acid is added to the ammoniacal solution to bring it within the specified pH range for precipitation of copper and zinc values.

8. A hydrometallurgical process as set forth in claim 1, wherein the ammoniacal solution contains lead values; the water used to dissolve the sulfate salts to form a copper-zinc brine is acidified to render the lead values insoluble as lead sulfate; and the insoluble lead sulfate is precipitated and separated from the copper-zinc sulfate solution.

9. A hydrometallurgical process as set forth in claim 1, wherein the brine liquor, from which the cuprous chloride is separated, is treated for the removal of residual copper values by the addition of metallic zinc dust for the precipitation of said copper values; and the precipitated copper values are separated from the brine containing the potassium sulfate and the zinc values.

References Cited
UNITED STATES PATENTS 3,196,004   7/1965   Kunda _____ 75—103 X OSCAR R. VERTIZ, Primary Examiner G. O. PETERS, Assistant Examiner U.S. Cl. X.R.

23—97, 121; 75—110